(12) United States Patent
Smith et al.

(10) Patent No.: US 7,765,117 B2
(45) Date of Patent: Jul. 27, 2010

(54) SYSTEM AND METHOD FOR MANAGING HEALTHCARE COSTS

(75) Inventors: Thomas Leonard Smith, Dallas, TX (US); Marshall Howard Hudes, Dallas, TX (US); James Mark Slaba, Bradenton, FL (US)

(73) Assignee: Open Market Partners, Inc., Dallas, TX (US)

( * ) Notice: Subject to any disclaimer, the term of this patent is extended or adjusted under 35 U.S.C. 154(b) by 987 days.

(21) Appl. No.: 11/178,260

(22) Filed: Jul. 8, 2005

(65) Prior Publication Data

US 2007/0011074 A1   Jan. 11, 2007

(51) Int. Cl.
*G06Q 40/00* (2006.01)

(52) U.S. Cl. .......................................... 705/4; 705/36 R

(58) Field of Classification Search ...................... 705/4, 705/36 R
See application file for complete search history.

(56) References Cited

U.S. PATENT DOCUMENTS

| | | | |
|---|---|---|---|
| 4,642,768 A * | 2/1987 | Roberts ........................ | 705/4 |
| 5,806,048 A | 9/1998 | Kiron et al. | |
| 6,085,175 A | 7/2000 | Gugel et al. | |
| 6,304,858 B1 * | 10/2001 | Mosler et al. ................. | 705/37 |
| 6,321,212 B1 * | 11/2001 | Lange ....................... | 705/36 R |
| 6,546,375 B1 | 4/2003 | Pang et al. | |
| 6,647,375 B1 * | 11/2003 | Gelman et al. ................ | 705/38 |
| 6,829,589 B1 | 12/2004 | Saliba | |
| 2004/0064341 A1 * | 4/2004 | Langan et al. ................. | 705/2 |
| 2004/0111291 A1 * | 6/2004 | Dust et al. ...................... | 705/2 |
| 2004/0143446 A1 | 7/2004 | Lawrence | |
| 2005/0091083 A1 * | 4/2005 | McGuigan et al. ............. | 705/3 |
| 2006/0085230 A1 * | 4/2006 | Brill et al. ..................... | 705/4 |
| 2006/0129428 A1 * | 6/2006 | Wennberg ..................... | 705/2 |

OTHER PUBLICATIONS

Hull, Kathy "Funding risks—Rising health care costs and the current pub"; Hospitals. Chicago: Apr. 20, 1993. vol. 67, Iss. 8; p. 38, 2 pgs.*
The Washington Post; "Risky Business; A Weekly Check on Health Care Costs and Coverage"; Washington, D.C; Jun. 17, 2003. p. F.02.*
Browning, Elizabeth, Marianne Legato, MD; "Public Health; Study links workplace gender issues to stress, health risks, healthcare costs" Heart Disease Weekly. Atlanta: Jul. 4, 2004. p. 73.*

* cited by examiner

*Primary Examiner*—Hani Kazimi
(74) *Attorney, Agent, or Firm*—Ward & Olivo

(57) ABSTRACT

Disclosed is a system and method for creating a financial index related to healthcare costs. A financial derivative instrument can be created from the index. Using the financial derivative instrument, an entity can hedge against unexpected fluctuations of healthcare costs.

32 Claims, 9 Drawing Sheets

Figure 3

| Ref. # | Area | Category | Sub-Category | Sub-Sub-Category | | 2003 Amount ($M) | 2003 % of Total | Correlation to Total HCI Curve | Significant Stakeholder |
|---|---|---|---|---|---|---|---|---|---|
| 1 | Ophthalmic products and orthopedic appliances — 211A | | | | | 22,396 | 1.4% | | |
| 2 | Drug Preparation and sundries — 211B | | | | | 233,690 | 15.0% | NO | YES |
| | | 2.1 | Prescription Drugs — 301 | | | 197,074 | 12.7% | | |
| | | 2.2 | Non-Prescription Drugs | | | 28,416 | 1.8% | | |
| | | 2.3 | Medical Supplies | | | 4,560 | 0.3% | | |
| | | 2.4 | Gynecological Goods | | | 3,640 | 0.2% | | |
| 3 | Medical Care — 211C | | | | | 1,301,071 | 83.6% | | |
| | | 3.1 | Physicians | | | 298,221 | 19.2% | | |
| | | 3.2 | Dentists | | | 74,960 | 4.8% | | |
| | | 3.3 | Other Professional Services | | | 205,070 | 13.2% | | |
| | | | 3.3.1 | Home Health Care | | 57,453 | 3.7% | | |
| | | | 3.3.2 | Medical Laboratories | | 21,572 | 1.4% | | |
| | | | 3.3.3 | Eye Examinations | | 6,092 | 0.4% | | |
| | | | 3.3.4 | All Other Medical Services | | 119,953 | 7.7% | | |
| | | 3.4 | Hospitals & Nursing Homes — 401 | | | 616,798 | 39.6% | YES | YES |
| | | | 3.4.1 | Hospitals | | 515,473 | 33.1% | | |
| | | | | 3.4.1.1 | Non-profit Hospitals | 333,934 | 21.4% | | |
| | | | | 3.4.1.2 | Proprietary Hospitals | 64,672 | 4.2% | | |
| | | | | 3.4.1.3 | Government Hospitals | 116,867 | 7.5% | | |
| | | | 3.4.2 | Nursing Homes | | 101,325 | 6.5% | | |
| | | | | 3.4.2.1 | Non-profit Nursing Homes | 38,482 | 2.5% | | |
| | | | | 3.4.2.2 | Proprietary & Government Nursing Homes | 62,843 | 4.0% | | |
| | | 3.5 | Health Insurance — 403 | | | 106,022 | 6.8% | NO | YES |
| | | | 3.5.1 | Medical Care & Hospitalization — 305 | | 88,149 | 5.7% | | |
| | | | 3.5.2 | Income Loss | | 2,167 | 0.1% | | |
| | | | 3.5.3 | Workers' compensation — 303 | | 15,706 | 1.0% | | |
| | | | | | TOTAL NIPA | 1,557,157 | 100% | | |

211

SYSTEM AND METHOD FOR MANAGING HEALTHCARE COSTS

FIELD OF THE INVENTION

The present invention generally relates to the fields of healthcare and finance. Specifically, the present invention relates to a system and method of managing the risks associated with unreliable healthcare costs.

BACKGROUND OF THE INVENTION

Individuals, enterprises, and corporations are continually exposed to the risk of future events beyond their control, which can either positively or negatively impact their financial stability. A corporation's financial stability is expressed in terms of yearly profit, the primary financial metric for many of its publicly available performance indicators. These indicators, including earnings per share, net income, and income growth are important to the success of a corporation because investors look to these indicators to assess whether to invest in the corporation. If the indicators are positive and indicate growth, investors are more likely to invest in the corporation. Therefore, it is important for a corporation to limit events that could negatively impact these indicators.

Risk can take many forms in view of the variety of future events that may occur. For example, some types of risk concern technical phenomena—the breakdown of a power plant, aircraft engine failure, or the damage to, or failure of, orbiting telecommunications satellites.

Another type of risk is economic in nature. Examples include fluctuation of commodity prices, currency exchange rates, interest rates, property prices, share prices, inflation rates, and market event based indices. Economic risk, also known as price risk, is the primary concern of financial markets.

Financial markets measure risk in terms of volatility, which is commonly defined as a statistical measure of the tendency of a market, security, or derivative to rise or fall sharply within a given period of time. If the tendency is for a security to rise or fall very sharply, the security is said to be highly volatile.

Volatility is an important component in the valuation of many financial derivatives. For example, when determining the value of an option, volatility is used as an independent variable that denotes the extent which the return of the underlying asset (e.g., stock prices) will fluctuate between the initial date of the option and its expiration date. In this way, volatility is an essential element when determining the level of option prices. If volatility is high, the premium (i.e., cost to purchase) on the option will be relatively high, and vice versa. Once you have a reliable measure of statistical volatility for any underlying asset, the fair market value of an option is calculable by utilizing a standard options pricing model.

However, the task of determining the volatility of a given financial instrument is not straightforward. As a result, many methods have been developed, and these methods vary greatly in their design, assumptions and results. Often management of various risks is performed using arcane technical language that varies from one functional area to another.

Normally a corporation delegates the responsibility of risk management to a risk manager, who considers the issues of probability and severity separately. Accordingly, sufficient data to accurately determine a volatility function is rarely available making it extremely difficult for organizations to place consistent valuations on associated risks, and to subsequently determine how to most accurately optimize the allocation of resources across an entire enterprise.

As a result, resources are allocated based upon either historical happenstance (i.e. the organization is aware of a recent large loss that increases its sensitivity to the risk associated with a particular hazard) or the organizational ability of the manager (i.e. the manager gathers more resources within the organization).

Some risk managers utilize more subjective ranking systems to order the relative severity, probability and control costs. Labels may be associated to each outcome indicating a subjective valuation of the severity and probability. For example severity may be ranked with labels such as "high," "medium," or "low." Probability may be ranked with labels such as "certain," "likely", "unlikely," or "rarely." The cost to control the risk can similarly be ranked as "high", "moderate" or "low". Certain ranking methodologies purport to apply equally to all risks in an organization, but do not establish consistent operational definitions and measurement methodologies across the various functional areas. "High" and "likely" labels indicate different levels of risk to different individuals. Existing methodologies do not recognize the interdependencies that exist between various risk controls, nor do they answer the question of whether economic value is being created by risk control efforts. In addition, quantifying risk in a subjective manner can lead to widely disparate results. Consequently, subjective ranking is often used as a screening method to determine relevant data sources.

After identifying likely volatile sources, risk managers generally attempt to mitigate the adverse consequences associated with that volatility. A traditional, well known mitigation method is the purchasing of insurance. Insurance is the simple transfer of risk from one party, the insuree, to another party, the insurer in exchange for the payment of a fixed premium price. Purchasing insurance to mitigate has several advantages. First, large entities with considerable experience with insuring a particular type of risk can often accurately predict the probability of loss, which enables insurers to set fairly accurate pricing. Second, insurers are able to pool risks by creating a large, diversified portfolio of policies. That is, by issuing a large number of insurance policies, an insurer can diversify its risk and reduce premiums to the consumer.

However, there are several disadvantages to using insurance as a risk management tool. While an insurer may accurately predict the probability and amount of loss, the administrative expenses associated with maintaining the accuracy of these functions are high. Also, insurance companies must deal with adverse selection because an insurer often cannot differentiate between a risk that never occurs and an event insured against which actually happens. Finally, insurers must deal with the "moral hazard." That is, once a risk has been insured, the insurer must be concerned that the insuree may exercise less careful to protect against the risk that may occur.

To compensate for the disadvantages, insurers must transfer some of the additional risk to the insuree by raising premium costs. As a result, the cost to protect against a given risk is often higher than it would be without the need to protect the insurer's additional risk. Of course, if the costs associated with managing risk by purchasing insurance outweigh the protections provided by the insurance, risk managers would be loath to purchase it. As a result, insurance is inherently an imperfect risk management system.

An alternative risk management tool is a process known as hedging, wherein parties exchange derivative instruments in order to offset the price risk associated with fluctuations in cash markets.

Many entities including commercial firms, consumers, and producers utilize a hedging technique to protect themselves from price risk. Hedging enables a party to transfer risk to another party because the parties leverage related products and services which respond similarly to the same economic factors. This leverage of related products and/or services is known as correlation.

An entity can use any of several derivatives in the hedging process. The simplest of such derivatives is known as a forward contract, which is a transaction wherein a buyer and a seller agree upon price and quantity for delivery of a specific service or commodity at a future point in time. While such a forward contract transfers risk, there are disadvantages to utilizing it as a risk management tool. For example, forward contracts are not standardized, so each transaction must be negotiated individually. In addition, while such forward contracts are legally binding, upon default a party must resort to the legal system for recovery. As a result of theses disadvantages, transaction costs associated with negotiating, maintaining and enforcing forward contracts are often unnecessarily high. Therefore, forward contracts are generally inefficient risk management tools.

Of course, in an attempt to compensate for the inefficiencies associated with variable-term forward contracts, they can be standardized as to include specific terms. Standardized forward contracts are known as futures contracts and are generally standardized with respect to quantity, time, and place for delivery of goods and services. Because futures contracts are standardized, an entity can theoretically purchase and sell futures contracts without ever actually taking physical delivery of the subject of the contract.

To eliminate the need for legal enforcement of a forward contract, a margin system was created to prevent buyers and sellers from defaulting on their contract. In a margin system, the buyer and the seller of a futures contract deposit cash to a margin account maintained by a third party, usually an exchange or a bank, as collateral to guarantee performance of the futures contract. In addition, a margin may be "marked-to-market," whereby the amount of money deposited into a margin account is updated continuously as the price of the underlying derivative fluctuates.

Since the terms of a futures contract are standardized and delivery need not ever be completed, a properly executed contract is all that is required for buying, selling, and trading the contract, making the process fairly liquid. To improve the liquidity of this process, exchanges were formed to facilitate these transactions on a larger scale. Currently, exchanges are the preferred forum for trading futures contracts because risk managers appreciate the benefits of standardized features.

Futures options are analogous to futures contracts. The difference between the two is the fact that with futures options a party is not actually obliged to actually accept delivery of the underlying commodity. Instead, a party has the right to refuse delivery. The result is that unlike futures contracts, futures options are not subject to margin calls (i.e., the instrument is not marked to market unless a party actually takes delivery) and have lower potential risk. There are disadvantages to purchasing a futures option. For example, because one party has the right to refuse delivery of the futures option, the futures option is more expensive to purchase that a futures contract. The higher price negatively impacts the return of the instrument, resulting in a lower yield. Because the yield is lower, it is a more inefficient risk management tool than a standardized futures contract.

Typical buyers and sellers of derivative instruments have a vested interest in the fluctuation of price rates and attempt to manage their risk accordingly. Alternatively, certain buyers or sellers (e.g., a speculator) can purchase the instrument without having a vested interest in the fluctuation of prices. A speculator will purchase or sell a futures instrument when he or she believes feels that he or she can predict what will happen with a particular price risk more accurately than the market.

Speculators are generally parties who purchase a derivative such that they will experience financial gain when the price fluctuation of the derivative is actually higher than an expected threshold, or sell a derivative such that they will experience financial gain when the price fluctuation of the derivative is lower than expected.

For example, consider a wheat farmer who wishes to sell his upcoming harvest. While prices for his crop remain steady, the farmer is worried that the value of his crops at harvest time will drop. The farmer (seller) can agree to deliver his wheat at harvest time to a miller, (buyer), who is worried that the price of wheat will increase between the contract date and the harvest (delivery) date. The farmer and the miller have both attempted to manage the risk of the commodity, namely wheat. Note that if the price of wheat rises, the miller is said to gain value because the contract was executed at a lower price. Conversely, if the price of wheat falls, the farmer gains value because the contract was executed at a premium over the price the farmer could have obtained.

The same principles hold for intangible financial products and services. For example, consider an entity that holds a contract to sell a product in a foreign market that will be paid for in foreign currency. If the foreign currency increases in value relative to the domestic currency, it will convert into less domestic currency. To protect itself against this currency risk, the domestic entity can buy a foreign currency futures contract. Similar to the farmer/miller example, if the foreign currency appreciates, the loss on conversion on the initial contract is offset by the increased value of the futures contract. As a result, hedging is the preferred method of managing risk regarding price risks associated with currency fluctuation.

Although there are numerous benefits to hedging, risk managers do not currently hedge against every contingency. To determine if a risk management strategy is needed, risk managers generally utilize a simple cost-benefit analysis. If the risk that needs to be hedged has only a small impact on an entity's business it may decide that hedging against that risk is unnecessary. Similarly, if the exposure is minimal, risk managers may be unwilling to invest limited resources to hedge. As a result, a company typically only hedges large expenditures and/or commodities that substantially impact the bottom line due to their underlying volatility.

For example, consider an entity that has a large exposure to inflation. To manage this risk the entity can purchase and/or trade a Consumer Price Index (CPI) future. The CPI index is a measure of inflation based on publicly available information. Since almost every entity is exposed to inflation related price risk there is a large market for buyers and sellers who wish to manage this risk and the CPI index market trades at a high volume. While it can be generally utilized effectively to hedge short-term changes in inflation, and the index price is stable because it is based on government-published historic data, because it is a new type of futures contract the total number of contracts available is limited. In addition, the CPI index is not an accurate measure of the volatility of uncorrelated products and services (e.g., healthcare) because uncorrelated products and services increase in price at a different rate than inflation.

By way of example, healthcare costs in the United States are presently increasing at two to three times the rate of inflation and at four times the rate of wage increases. In an attempt to measure the increase in healthcare costs, entities rely on the healthcare trend, which indicates the percentage increase of healthcare expenditures per capita over a predetermined period of time. The components of the healthcare trend are highly variable, making the healthcare trend extremely volatile. For instance, general inflation, consumer demand, government regulation, drug costs, unit cost, seasonality, and annual fluctuations in severity of variable illness, all of which are exemplary components of the healthcare trend, are very volatile. Therefore entities that attempt to manage health related expenditures have difficulty budgeting and forecasting these costs due to this volatility, which affects the entity's bottom line. Because of the direct impact of sharply rising healthcare costs on an entity's financial stability, managing the price risk of healthcare related costs is vital.

For example, a Fortune 100 company like General Motors has high financial exposure to such risk factors as currency risk, credit risk from its financing division, interest rate risk from its financing division, and fuel cost risk from the sale of automobiles. These financial risks are correlated to significant sources of revenue from (or significant expenditures related to), automobile products and services. General Motors therefore hedges against these risks in one form or another utilizing financial derivative instruments.

In 2003, General Motors (GM) spent $4.8 billion on healthcare for its employees, which constituted an expenditure greater that its expenditure for steel. Because healthcare costs comprise a large percentage of General Motor's expenditures, one would expect it to manage its healthcare risk by utilizing financial derivatives. However, because there is no reliable method for managing its healthcare risk in this manner, General Motors does not manage healthcare risk using financial derivatives. Instead, it relies on other risk management techniques.

Presently, the only viable method of managing the risk associated with healthcare costs is for an entity to purchase health insurance. The insurance premiums associated with such insurance have been rising at an alarming rate due to increasing costs that reflect the inherent variability of the healthcare industry, such as the cost of prescription drugs. As a result, the present system for managing risk associated with healthcare costs (i.e., health insurance) is inefficient.

As premium costs continue to rise, insurance companies presently offer a variety of insurance types in an attempt to manage price risk and volatility of healthcare expenditures.

One type of the insurance now offered is a method of reducing healthcare costs known as stop-loss insurance.

Stop-loss insurance is purchased by self insured employers in an attempt to stabilize their healthcare costs. While a typical self insured employer can predict the approximate number of doctor visits its employees will have in a given year, it cannot predict the number of "catastrophic events" (e.g., premature births, cancer, and organ transplants) that will occur in a given year. The costs associated with these procedures can be devastatingly high to a self insurer so there exists a need to hedge against this type of risk.

There are two main types of stop-loss insurance. The first is known as Individual Stop Loss "ISL," sometimes called Specific Stop Loss. Individual Stop Loss protects an employer against expenditures by single individuals which exceed a predetermined dollar limit chosen by the employer. For example, if an employee of the insured incurs injuries in an accident that requires expenditures that far exceed the premium's stated deductible, the ISL insurance would reimburse the employer for all associated expenses beyond a predetermined dollar amount.

The second type of stop-loss insurance is known as Aggregate Stop Loss (ASL), or Excess Risk Insurance. Aggregate Stop loss insures an employer against the total expenditures by its employees as compared to a predetermined dollar amount. An employer typically purchases ASL to cover against 125% of the level of expected claims predicted by the insurance carrier. For example, a mid sized self insurer with $4 million in expected claims could purchase a stop loss policy that initiates when $5 million in claims are incurred.

Despite the obvious advantages associated with the various types of stop loss insurance, there are numerous disadvantages. For example, conservative pricing and limited availability of stop loss insurance policies severely curtails the usefulness of stop loss insurance to small health plans with limited financial resources. In contrast, large companies can afford the costs associated with a few catastrophic claims, so the steep cost of stop loss insurance becomes economically wasteful.

Consequently, stop loss insurance is limited to mid-sized self insured employers because such entities often do not have large enough cash reserves or generate enough income to cover the costs associated with several catastrophic claims. In addition, stop loss insurance solutions maintain extreme volatility because typical stop loss plans do not take effect until the incurred claims exceed a 25% threshold.

Because current healthcare risk management techniques have limited success and sharply rising healthcare costs continue to impact an entity's financial stability, there is a clear need in the art for a system and method to more effectively manage the risk associated with healthcare costs. The present invention overcomes the various deficiencies associated with traditional healthcare risk management techniques by creating a novel healthcare index and associated financial derivative instrument that allows risk managers to effectively and efficiently hedge the highly volatile fluctuations associated with predicting healthcare costs.

SUMMARY OF THE INVENTION

Disclosed is a method for creating a healthcare related index. In general, the method entails gathering a source of data, assessing it for relevance to the overall healthcare trend, (or a particular subset thereof), and calculating an index value based on the most relevant source of data. Any source of data can be used, but it should closely correlate to the United States healthcare trend. For example, the following data sources are known to have at least some correlation with the United States healthcare trend: the medical CPI, the producer price index, national health accounts, medical expenditure panel survey, Medicare economic and price index, Kaiser/HRET annual employer health benefits survey, AHA annual survey, Mercer national survey of employer sponsored health plans, Ingenix, Milliman health cost index, and Medstat. Of course, any data source that correlates with the healthcare trend can be used in accordance with the present invention without departing from the spirit of the invention.

The data source can be assessed for relevance to the overall healthcare trend (or a particular subset thereof) in any well known statistical manner. For example, the data source can be visually inspected for relevance via a graph, spreadsheet, or any other similar manner. In addition, a variety of well known statistical software programs and techniques can be utilized to determine whether the data source is relevant.

Finally, the data source is used to create a healthcare related financial index. Any well known mathematical approach can be used to create the index. For example, the relative values of the data can be added together to form an aggregate index value. Alternatively, the data can be assigned different statistical weights to create a weighted average or the data can be normalized on a per capita basis. Indeed, any well known mathematical approach can be used to create an index value, as long as the index value accurately reflects the United States healthcare trend.

Also disclosed is the creation of a healthcare derivative instrument for use in the management of healthcare related expenditures. Once such a derivative exists, it will attract a large market for buyers and sellers of the derivative as a method of managing risk. For example, typical buyers would generally comprise entities which currently provided healthcare insurance related services and could be self insured employers, entities with large or mid-sized health plans, re-insurers, the United States and/or foreign governments, and speculators. Typical sellers would generally comprise entities which provide healthcare services and could include hospital systems, pharmaceutical companies, medical supply companies, healthcare sector mutual fund companies, physician groups, re-insurers, and speculators. Of course, other parties could purchase healthcare related derivatives as well.

A healthcare derivative instrument is constructed such that price fluctuation of the instrument correlates to the price fluctuation of healthcare costs. This can be achieved by constructing an underlying index that responds primarily to fluctuating healthcare costs.

The healthcare index allows healthcare related derivative products to be traded on a publicly available exchange, such as the Chicago Board Options Exchange. Benefits associated with trading the financial derivative of the present invention an exchange include improved liquidity and increased volume.

Finally, to increase trading of a derivative instrument, the derivative must be credible. It must therefore be based on accurate, objective, publicly available data. Therefore, an essential component of a healthcare related financial derivative in accordance with the present invention is a properly created healthcare index.

There are numerous potential sources of publicly available, objective, credible data in the field of healthcare. Examples include the government, charitable foundations, trade organizations, professional organizations, and proprietary healthcare data companies.

The following table summarizes a small number of currently available data sources:

TABLE 1

DATA SOURCES

| Name | Description of Data | Source of Data | Frequency of Updates | Data a Strong Indicator of: |
|---|---|---|---|---|
| Medical CPI | Measures average change in medical care prices paid by urban consumers. | Bureau of Labor Statistics (BLS) | Monthly | Hospital (Inpatient versus Outpatient) Professional Services Prescription Drugs and Medical Supplies Nursing Homes |
| Producer Price Index | Measures average change in prices charged by suppliers of medical care. | Bureau of Labor Statistics (BLS | Monthly | Hospitals (1995) Physicians (1998) Pharmaceuticals Nursing Homes (2004) Medical & Diagnostic Lab (2004) Home Health Care (1997) |
| National Health Accounts | Measures health care spending in the US by type of service and source of payment. | Centers for Medicare and Medicaid Services (CMS) | Annually | Hospital Care Professional Services Prescriptions Drugs, DME Nursing Home & Home Health Investments |
| Medical Expenditure Panel Survey | Nationally representative survey that collects data on health status, access to care, health care use and expenses, and health insurance coverage of US. | Agency for Healthcare Research and Quality | Annually | Hospitals (Inpatient & Outpatient) Physician Services Prescription Drug Home Health Services |
| Medicare Economic and Price Index | Measures changes in cost of physicians' operating expenses versus input prices for Medicare. | Centers for Medicare and Medicaid Services/ Global Insights | Quarterly | Hospitals Physician Services Home Healthcare Skilled Nursing Facilities |
| National Income and Product Accounts | Measures personal consumption and expenditures component of the gross domestic product. | Bureau of Economic Analysis | Quarterly | Hospitals Professional Services Prescription Drugs |
| Kaiser/HRET Annual Employer Health Benefits Survey | Nationally representative survey of public and private employers that measures employer sponsored health insurance coverage. | Kaiser Family Foundation/ Health Research and Educational Trust | Annually | Hospitals Physician Services Employer Expenses |
| AHA Annual Survey | Survey of approximately 6,000 hospitals that reports organization structure, staffing, utilization, and financial data. | American Hospital Association | Annually | Hospitals Physician Services |
| Mercer National Survey of Employer Sponsored Health Plans | Survey of public and private employers that reports data on premium & contributions, and plans design. | Mercer Human Resource Consulting | Annually | Hospitals Employer Expenses |
| Ingenix | Database of health expenditures on employees from self-funded employers. | Ingenix | Varies | Hospitals Physician Services Employer Expenses |

TABLE 1-continued

DATA SOURCES

| Name | Description of Data | Source of Data | Frequency of Updates | Data a Strong Indicator of: |
|---|---|---|---|---|
| Milliman Health Cost Index | Measures the average rate of increase in medical costs for a typical $250 deductible comprehensive major medical plan. | Milliman USA | Quarterly | Hospital (Inpatient & Outpatient) Physician Services Prescription Drugs |
| Medstat | Database of health expenditures on various commercial, Medicare, and Medicaid plans. | Medstat | varies | Hospitals Physician Services |

Also disclosed is a method of utilizing a healthcare derivative product to create various portfolios of holdings commonly known in the art as "baskets."

The preferred embodiment of the present invention utilizes data derived from the National Income & Product Accounts "NIPA" in the creation of a healthcare index. At the present time, utilization of NIPA data results in the most accurate healthcare index in accordance with the present invention. However, as one of ordinary skill in the art would recognize, economic factors can vary greatly over a short period of time and therefore any data source, whether currently existing or created in the future may be utilized to create a healthcare index. NIPA data is comprised of discrete accounts related to specific healthcare products and services, and therefore the index of the present invention inherently contains discrete, easy to price, targeted segments, dr tranches. As a result, an entity need not purchase a financial derivative based solely on the healthcare index. Rather it can determine specific areas that have higher occurrences of volatility. For example, if an entity incurs healthcare costs in large part related to the cost of providing prescription drugs, that entity can more effectively manage its healthcare risk by purchasing a healthcare derivative based solely on the prescription drug tranche.

As another example, a prescription drug index can be created in the manner previously disclosed. Advantageously, NIPA data contains predetermined, discrete data that correlates to several healthcare factors. This data can be used to create an index that correlates to the overall healthcare trend or that correlates to any of the other healthcare factors (e.g., prescription drugs).

After creating the healthcare index based on a data source such as NIPA, the index is used to create an associated financial derivative. The financial derivative can be any financial derivative known to one of ordinary skill in the art, such as a futures contract, a forward contract, or a futures option. The price of the healthcare derivative is related to the healthcare index because each derivative represents a share of the healthcare index. By using a derivative with standardized features such as quantity and delivery date, the derivative can then be treated as a commodity on an exchange.

The present invention also discloses a method for using the associated derivative instrument to hedge the risk associated with healthcare costs. To accomplish this, an entity creates a hedge ratio to determine the number of financial derivatives to purchase in order to mitigate a deviation in predicted healthcare related prices. After determining the hedge ratio, an entity can buy or sell the appropriate derivatives.

Accordingly, an object of the present invention is to provide a system and method which enables an entity to hedge its risk associated with healthcare expenditures.

Another object of the present invention is the creation of a healthcare index that is correlated with the healthcare trend to facilitate the creation of an associated financial derivative.

Another object of the present invention is to utilize publicly available data to create a healthcare index.

Still another object of the present invention is the creation of a financial derivative having a price determined by an accurate healthcare index.

Yet another object of the present invention is to utilize the healthcare index to create a standardized healthcare related financial derivative instrument.

Another object of the present invention is to create a market to exchange a standardized healthcare related financial instrument.

It is another object of the present invention to create a healthcare index related instrument that is available for purchase over the counter.

Still a further object of the present invention is to use tranched data to create healthcare index sub-indices.

Yet a further object of the invention is the creation of an algorithm that allows entities to objectively measure healthcare risk.

BRIEF DESCRIPTION OF THE DRAWINGS

A further understanding of the present invention can be obtained by reference to a preferred embodiment set forth in the illustrations of the accompanying drawings. Although the illustrated embodiment is merely exemplary of systems for carrying out the present invention, both the organization and method of operation of the invention, in general, together with further objectives and advantages thereof, may be more easily understood by reference to the drawings and the following description. The drawings are not intended to limit the scope of this invention, which is set forth with particularity in the claims as appended or as subsequently amended, but merely to clarify and exemplify the invention.

FIG. 3 is a tabular depiction of the component parts of a preferred data source.

DETAILED DESCRIPTION OF THE PREFERRED EMBODIMENT

A detailed illustrative embodiment of the present invention is disclosed herein. However, techniques, systems and operating structures in accordance with the present invention may be embodied in a wide variety of forms and modes, some of which may be quite different form those in the disclosed embodiment. Consequently, the specific structural and functional details disclosed herein are merely representative, yet in that regard, they are deemed to afford the best embodiment for purposes of disclosure and to provide a basis for the claims herein which define the scope of the present invention.

Moreover, well known methods, procedures, and substances for both carrying out the objectives of the present invention and illustrating the preferred embodiment are incorporated herein but have not been described in detail as not to unnecessarily obscure aspects of the present invention.

None of the terms used herein, including "future", "futures contract", "derivative", "instrument", and "option" are meant to limit the application of the invention. The terms are used interchangeably for convenience and are not intended to limit the scope of the invention. Similarly, the use of the term "company" or "corporation" is not meant to limit the scope of the invention to one type of entity, as any entity or individual can utilize the present invention. The following presents a detailed description of a preferred embodiment of the present invention.

Figure 1:
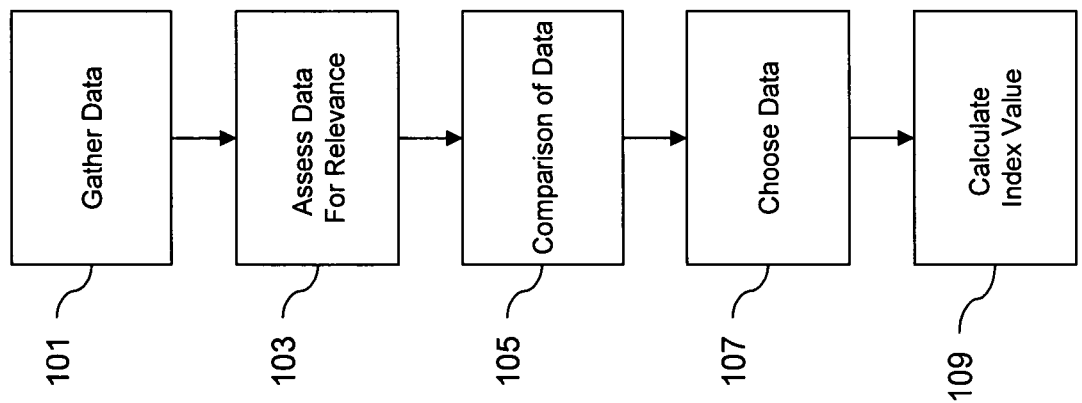
FIG. 1 is a flow chart generally depicting the method of creating a financial derivative index.

Referring to FIG. 1, depicted is a method of calculating the value of a healthcare derivative index as shown in step 109. Initially, data related to healthcare can be gathered 101 from any source as depicted in step 101. In a preferred embodiment this data is made available periodically from a public source and has proven to be credible, reliable, and frequently disseminated. The data source according to the preferred embodiment is National Income & Product Accounts data for reasons discussed below. An ordinary skilled artisan would recognize that any data source could be utilized including: the medical CPI, the producer price index, national health accounts, the medical expenditure panel survey, the Medicare economic and price index, the Kaiser/HRET annual employer health benefits survey, the AHA annual survey, the Mercer national survey of employer sponsored health plans, Medstat, the Milliman Health Cost Index, Ingenix, or any other data source currently known or developed in the future. In the preferred embodiment of the present invention, the data is downloaded from an online source (e.g., the internet) and stored in a database, but any well known method of gathering data can be utilized to gather the data as depicted in step 101 without departing from the spirit of the invention.

According to the present invention, after data is gathered 101, the data is assessed and filtered with respect to its relevance as depicted in step 103 by comparing the data to healthcare related economic factors. In the preferred embodiment of the present invention, the data is assessed according to a subjective ranking system, including any number of factors, including but not limited to: relevance, timeliness, reliability, understandability, market applicability, accessibility, and independence of the data. The value of each factor is subjectively assigned according to a three point scale (high, medium, or low priority) all of which are equally weighted. Any other method and means for assessing and categorizing the data can be used without departing from the scope of the invention. For example, alternative embodiments of the present invention can assign values to various features using a five point (e.g., 5—highest, 1=lowest) scale. It is contemplated that any number of factors can be cited, and any subjective ranking system can be implemented in accordance with the present invention.

The analysis of several presently available sources of data is depicted in Table 2. Of course, it is contemplated that a similar analysis can be conducted at any point in the future to consider contemporaneously available data sources. The results are tabulated below:

TABLE 2

COMPARISON OF DATA SOURCES

| | Relevance | Timeliness | Reliability/ Consistency | Understandability | Market/Industry Acceptability | Accessibility | Independence/ Neutrality |
|---|---|---|---|---|---|---|---|
| Producer Price Index | Medium | High | High | High | High | High | High |
| Kaiser/HRET Annual Employer Health Benefits Survey | High | Medium | Medium | High | High | High | High |
| Medical CPI | Low | High | High | High | High | High | High |
| National Health Accounts | High | Low | High | Medium | High | High | High |
| National Income and Product Accounts | Medium | High | High | Low | Medium | High | High |
| Medicare Economic and Price Index | Medium | Medium | High | Medium | Medium | High | High |
| Mercer National Survey of Employer Sponsored Health Plans | High | Medium | Low | High | Medium | Medium | Medium |
| Ingenix | High | Medium | Medium | Medium | Medium | Low | Medium |
| Medstat | High | Medium | Medium | Medium | Medium | Low | Medium |
| Milliman Health Cost Index | High | Medium | Medium | Medium | Medium | Low | Medium |
| Medical Expenditure Panel Survey | Medium | Low | Low | Low | Medium | High | High |
| AHA Annual Survey | Medium | Low | Medium | Medium | Medium | Low | Medium |

To select the most compatible data pool for use in the system and method of the present invention, the data sources that are deemed most useful (i.e., have the highest overall subjective rankings) are compared to historical buying and selling trends within the healthcare industry as depicted in step 105. Comparisons can be made by plotting the data versus a baseline indicative of the trends in the healthcare industry and visually inspecting the results to determine whether the data adequately correlates. Alternatively, any statistical analysis can be implemented as is known by one of ordinary skill in the art.

Figure 2:
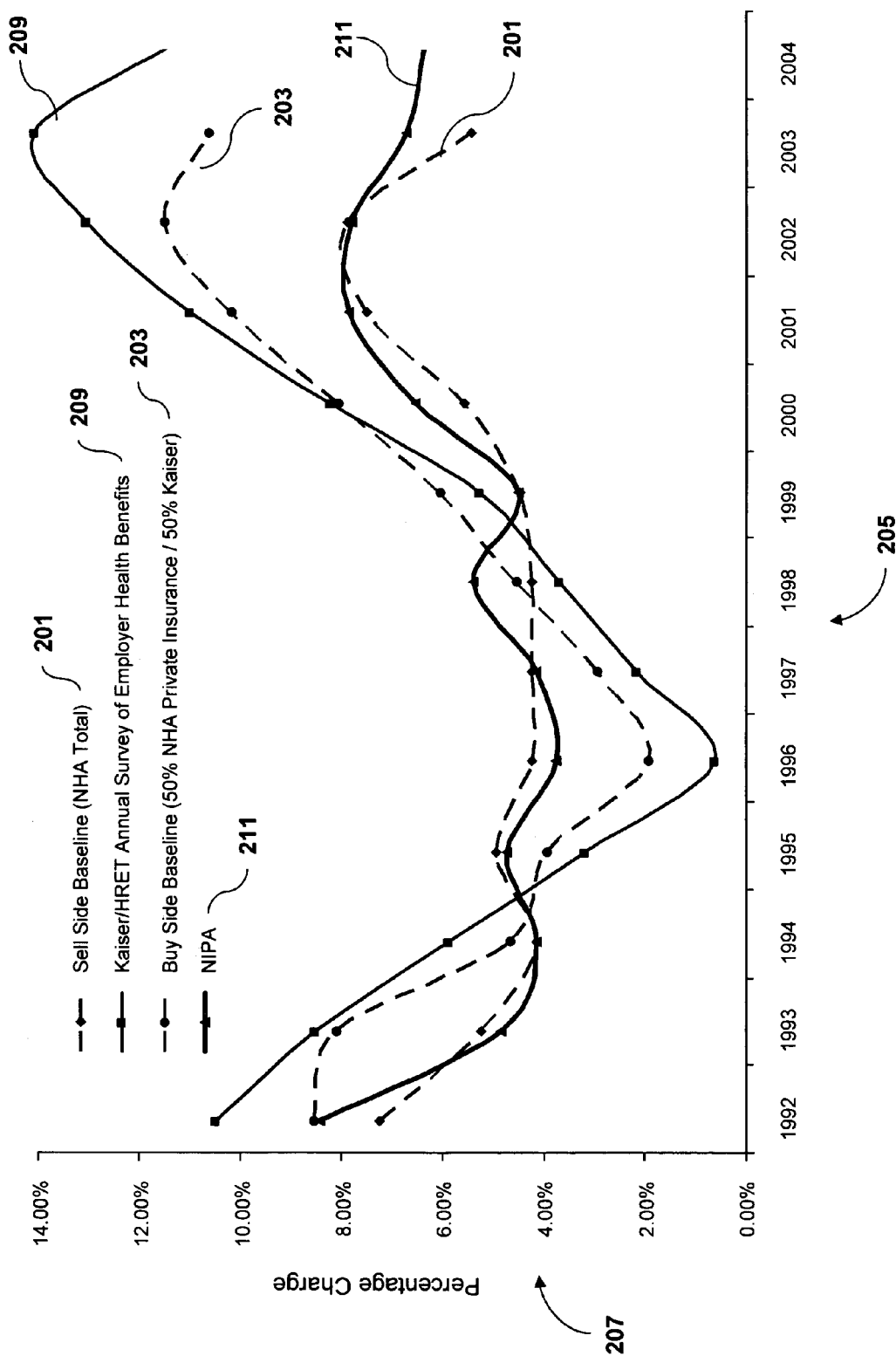
FIG. 2 is a depiction of graphically comparing potential source data to potential buyers and sellers.

Referring now to FIG. 2, shown is an example of the comparison of selected source data to historical buying trends in accordance with the preferred embodiment of the present invention. Historical sell side baseline data 201 and buy side baseline data 203 are plotted as a function of percentage change over time (in years). Generally, X axis 205 represents the historical timeline, while Y-axis 207 represents the percentage change of each of sell side baseline 201, buy side baseline 203, Kaiser/HRET Annual Survey of Employer Health Benefits data 209 (a potential data source), and NIPA data 211 (a second potential data source). Sell side baseline data 201 is derived from the National Health Accounts and reflects the average change in health related services of investors likely to sell healthcare related derivatives for risk management purposes. Buy side baseline data 203 is derived from an equal weighting of both 1) the National Health Accounts and 2) the Kaiser/HRET Annual Employer Health Benefits Survey and reflects the average change in health related services of investors likely to purchase healthcare related derivatives to manage risk. Any other source that reflects contemporary potential buying and selling preferences can be utilized as baseline values as well. After plotting baseline data 201 and 203, potential index data 209 and 211 are plotted on the same graph. In the example depicted in FIG. 2, one potential data source is derived from the Kaiser/HRET Annual Employer Health Benefits Survey data 209 and a second potential data source is based on the National Income and Product Accounts "NIPA" data 211. Of course, any potential data source (including those listed in Table 2) can be plotted on the graph to determine this relative correlation to baseline data for a given time period to assess the relative viability of each data source. By using the graph a visual comparison can be made. In the example, a visual comparison of NIPA data 211 reveals that it correlates well with sell side baseline 201. In addition, NIPA data 211 falls within the spread (i.e., the gap between the sell side baseline and the buy side baseline). This is advantageous because various parties (e.g., speculators, buyers, and sellers) can utilize the index to manage the risks associated with healthcare costs. In contrast, Kaiser/HRET data 209 does not visually appear to correlate with either the sell side baseline 201, the buy side baseline 203, or fall within the spread of the two baselines. This indicates that at the present time, Kaiser/HRET data 209 data is not as advantageous as NIPA data 211.

Referring now to FIG. 1, after comparing data sources to potential buyers and sellers in step 105, a data source is chosen as depicted in step 107. In accordance with the present invention it is preferable to select a data source that correlates with the preferences of buyers and sellers as depicted in FIG. 2. In the preferred embodiment, the data source chosen in step 107 is the National Income & Product Accounts (NIPA) 211.

Once a data source is chosen as depicted in step 107, an index value is calculated and generated as depicted in step 109. The index can be calculated using any well-known statistical measure, including but not limited to linear regression and best-fit analyses. In the preferred embodiment, the index value is calculated from NIPA data and the index value is created by adding the relevant data values (e.g., ophthalmic products and orthopedic appliances, medical care, and hospitals and nursing homes) while eliminating less relevant sub-components (e.g., new home construction). The numerical value of this data is then normalized based on population trends as reported by any number of population estimating agencies, including but not limited the United States Census Bureau and the Bureau of Economic Affairs. It is contemplated that any other well known method of normalizing data or calculating an index value can be used in accordance with the present invention.

FIG. 3 depicts the various components of the preferred data source according to step 107, NIPA data source 211. More specifically, FIG. 3 depicts NIPA data relating to ophthalmic products and orthopedic appliances 211A, drug preparations and sundries 211B, and medical care 211C. In the preferred embodiment of the present invention, these components of NIPA data source 211 are utilized to create a healthcare index.

One of ordinary skill in the art will understand that it is contemplated that other means of combining component parts of NIPA data source 211 or combining component parts of other data sources can be implemented in accordance with the present invention. For example, in an alternative embodiment of the present invention, NIPA data source 211 is composed of a weighted average of various component parts 211A, 211B, and 211C. In this alternative embodiment, a healthcare index more sharply focused on various components can be created. In this way, a unique healthcare index can be created for each sub-industry within the healthcare industry utilizing the system and method of the present invention.

Figure 4:
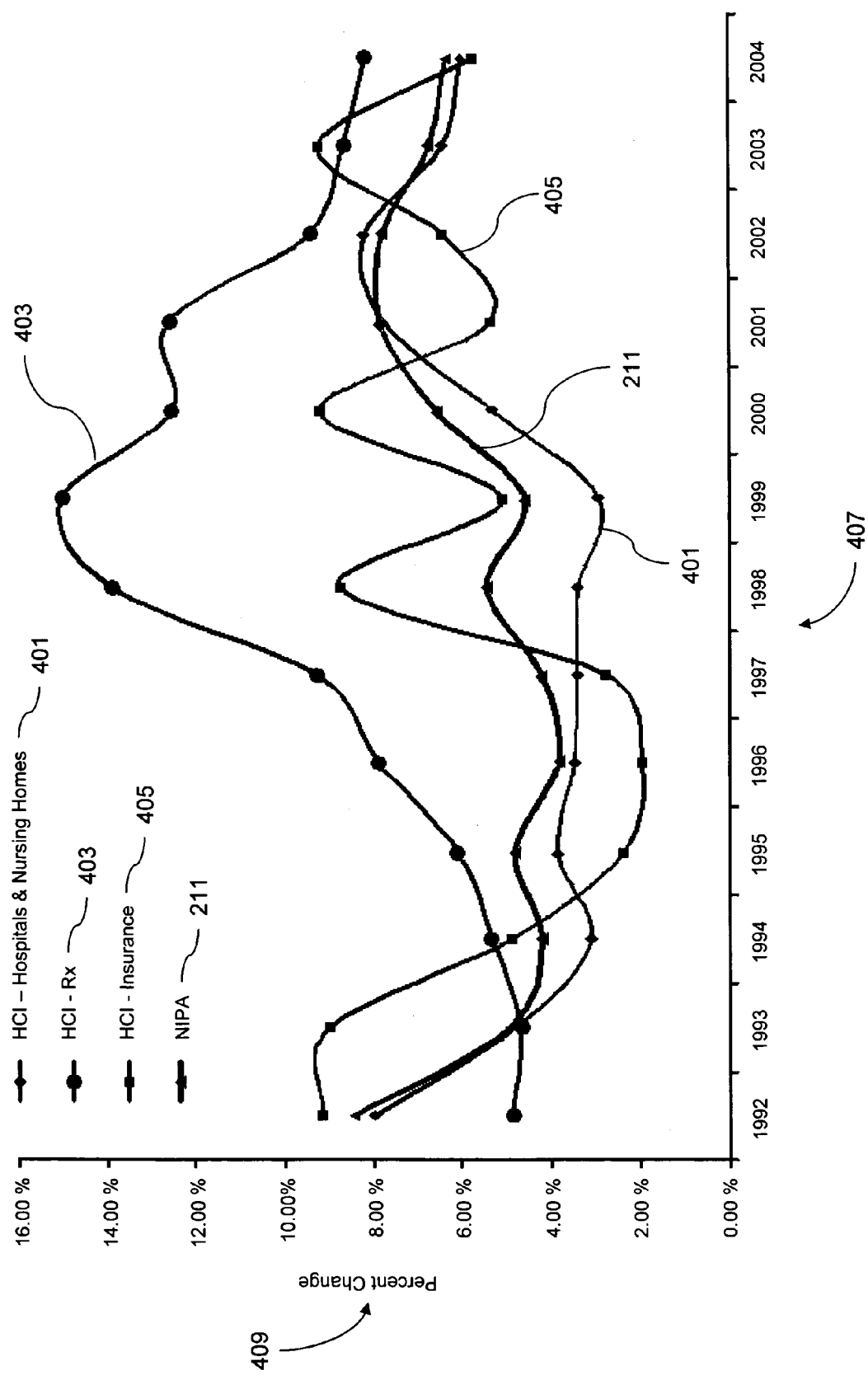
FIG. 4 is a graphical depiction of the differences between several constituent components of a preferred data source.

For example, FIG. 4 shows a graphical representation of certain components of NIPA data source 211 as compared to the whole of NIPA data source 211. More specifically, FIG. 4 depicts the percentage change of the value of each component, which is plotted on X-axis 407, over the course of time (by year) on Y-axis 409. In the alternative embodiments depicted in FIG. 4, potential data sources include component data related to Hospitals and Nursing Homes 401, Prescription Drugs "HCI-Rx" 403, Insurance "HCI-Insurance" 405 and NIPA data 211. FIG. 4 illustrates the differences in volatility of the component parts of the healthcare index created using NIPA data source 211.

In the alternative embodiment depicted in FIG. 4, selecting any of the depicted component parts will enable creation of an alternative index in accordance with the present invention. For the sake of clarity, any index created by utilizing one or more component parts of a data source shall be referred to as "sub-indices."

Creating sub-indices is advantageous when the risk that the entity wishes to manage does not satisfactorily correlate to total NIPA data source 211. It is also useful when an entity wishes to hedge a specific, localized risk.

For example, Prescription Drugs data 403 has not historically correlated statistically with NIPA data 211 even though prescription drugs data 403 is a significant component of the data. If an entity wishes to hedge its risk associated with the volatility of prescription drug costs, a prescription drug sub-index can be created using prescription drug data 403. That is, in accordance with the present invention, creation of a sub-index calculating its value can be accomplished using any well-known statistical measure.

Once a data source is selected for creation of an index (e.g., as depicted in step 107, FIG. 1) the associated index value can be calculated using any mathematical approach as previously disclosed. For example, referring to FIG. 3, a sub-index related to prescription drugs can be created using NIPA data 301. In addition, data 301 can be normalized in a well known manner. In a preferred embodiment, data 301 is normalized on a United States population per capita basis.

In addition, it is contemplated that other sources of data can be used to create sub-indices. For example, data related to worker's compensation 303 and/or data related to medical care and hospitalization 305 can be used in a similar manner to create additional sub-indices. That is, an index can be calculated to correspond to the overall worker's compensation trend.

Figure 7:
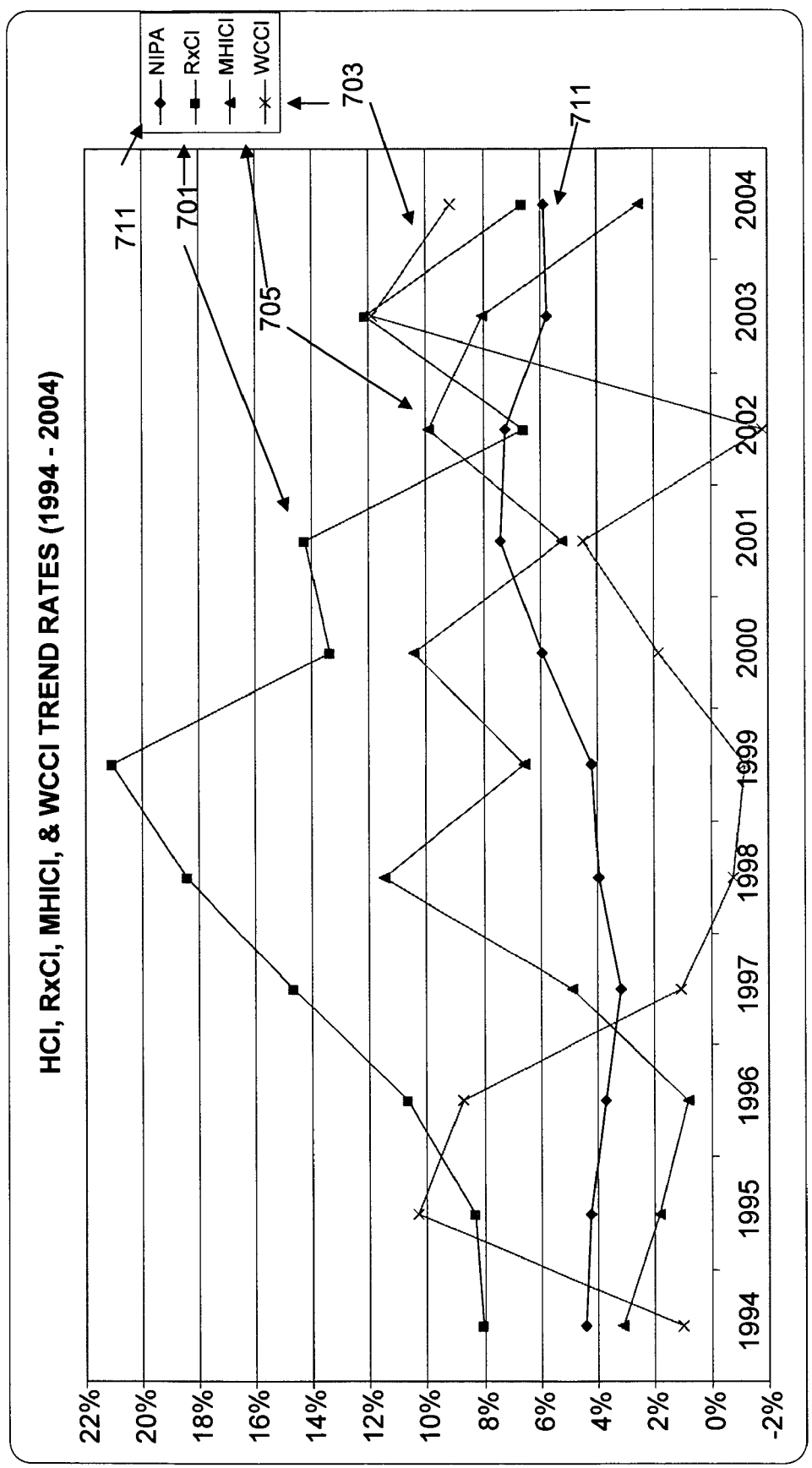
FIG. 7 is a graphical depiction of the creation of sub-indices from a general Healthcare Index.

FIG. 7 depicts examples of the creation of sub-indices from a general healthcare index. NIPA 211 serves as the source of healthcare index 711. Sub-indices were created in a manner consistent with the method described above to create prescription drug index 701 (derived from prescription drug data 301) worker's compensation index 703 (derived from worker's compensation data 303), and medical care and hospitalization index 705 (derived from medical care data 305). In general, the method used to calculate an index that correlates to the overall healthcare trend (e.g., FIG. 1) is utilized to calculate indices which correlate to specific subsets of the healthcare trend (e.g., prescription drugs).

A preferred method of using the healthcare index of the present invention is to construct a financial derivative instrument that utilizes the healthcare index as a price source. Types of financial derivatives include futures contracts and futures options, as well as other types well known in the art. In the preferred embodiment of the present invention, the derivative instrument utilized is a futures contract comprised of a forward pricing contract with a settlement price determined by the healthcare index and other standardized features.

More specifically, the derivate settlement price of the futures contract will be determined in accordance with the annualized percentage change between the healthcare index on the settlement date and the index at the date the derivative is purchased. The purchase date and settlement date of the derivative coincide with the release of the healthcare index's underlying source data. (e.g., in the preferred embodiment, the derivative purchase date and settlement date will coincide with the release of NIPA source data 211). Formulating a futures contract in such a manner minimizes arbitrage opportunities and improves efficiency in trading markets because it ensures that every party receives the information at the same time. That is, it eliminates the problem of asymmetric market information.

In the preferred embodiment of the present invention, the derivative is created having standardized features such that it can be offered on an existing exchange. For example, a standardized futures contract is typically a forward pricing contract purchased on a margin that is assessed daily. In addition, they are marked to market and have standard settlement dates.

Of course, there may be incremental margin requirements incurred with the trading of this instrument. The exact amount initially depends on the exchange, the type of futures contract, and the instrument's volatility. In addition, for the purposes of the foregoing examples, brokerage fees are estimated to be approximately $10 per contract.

While offering the contract on an exchange does require purchasing it on margin, most entities already have a margin account at the larger exchanges, so that this requirement will have little, if any impact on cash flow.

It is not necessary for the derivative instrument described in the preferred embodiment of the present invention to be offered on an exchange. Rather, it is contemplated that alternative embodiments of the present invention can include unique derivative instruments offered "over the counter." These alternatives allow for customization of financial derivatives, including the creation of a basket of derivatives.

The present invention further relates to a method of using a financial derivative to manage the risks associated with healthcare volatility.

Figure 5:
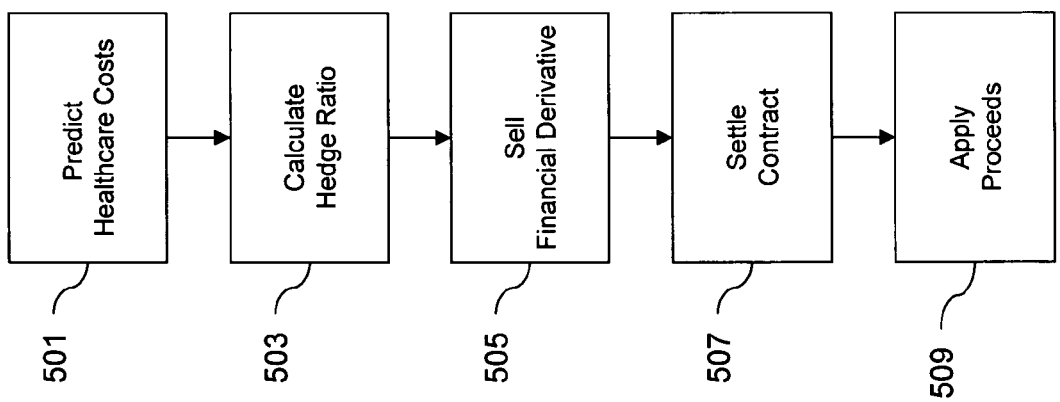
FIG. 5 is a flow chart depicting a method in which a large company can hedge against healthcare volatility.

Referring now to FIG. 5, shown is an example of a self insured employer using a financial derivative based on a healthcare index to manage its risk against healthcare cost volatility in accordance with the present invention. Initially, an entity predicts its expected healthcare costs as depicted in step 501. Any means of predicting costs can be used, all of which are well known in the art. The process of the current invention will be demonstrated by an example in which a Company predicts a 10% increase in expected medical expenses, from $40 million to $44 million using any commonly known prediction technique. The Company also predicts that in its worst-case scenario, the costs incurred will be $2 million higher than originally predicted. Conversely, the Company predicts its best-case scenario to be that its costs incurred are $2 million less than predicted.

After predicting its costs, the Company must determine the appropriate number of futures contracts to sell in order to effectively hedge against the calculated risk associated with the prediction of step 501. To accomplish this, the Company calculates its hedge ratio 503 using the price of contemporaneously available futures contracts based on the healthcare index. In this example, it is assumed that contemporaneous futures contracts are selling at $90, which reflects a 10% increase in the NIPA healthcare index over the course of the year. Using this data as a starting point, the Company decides how much risk exposure they wish to hedge against and how much of their cash holdings they will spend to hedge that exposure. These factors are combined to form a hedge ratio in any manner that is well known in the art. Indeed, today many entities either calculate their own hedge ratios with respect to non-healthcare risk or rely on consulting firms to help determine such ratios. Of course, other embodiments of the present invention allow for various other factors to be incorporated into a hedge ratio, as is well known in the art. The hedge ratio is then used in a well-known manner to calculate the number of contracts to sell.

After determining the number of contracts to sell, the Company would sell the requisite number of contracts 505. In this example of the embodiment of the present invention, we assume that the Company determines that it will sell 40 contracts at $90.00 per contract. It is also assumed that the value of the index on the date of sale is $4000. The Company can either construct custom futures contracts in the manner previously described or use a standardized futures contract, and we assume the quantity of each standardized contract is 10,000.

The Company may then offer the futures contracts for sale privately, over the counter, or publicly on an exchange. In the presently described embodiment, the contracts are offered on an exchange, but in alternative embodiments, the contracts could be standardized and offered on an exchange or the Company could construct the contracts in any manner that it chooses and offer them for sale in any manner.

After offering the contacts for sale, the Company can allow the contracts to settle as shown in step 507. Alternatively, it can manage the futures contracts in any manner known, including repurchasing any portion of the contracts it has offered on any day at a value determined by the index price, or sell more contracts at the market price.

On the settlement date of the futures contracts, the Company delivers its contracts. The value of the healthcare index on the settlement date is used to determine the settlement price. In the currently described embodiment, it is assumed that on the settlement date the healthcare cost index increased to $4550. The contract value is then determined by the below formula:

$$100 - (100 * ((\text{Index Value on settlement date} / \text{index value on offer date}) - 1))$$

Knowing that the value of the index at settlement is $4550 as the value of the index at offering was $4000, the contract value of $86.25.

To determine its total profit or loss, the Company uses the formula:

Units/contract*# of contracts*price difference=Profit (Loss)

In the previously described embodiment the Company would profit in the amount $1,500,000.

Note that when implementing the formula, the number of contracts is expressed as a negative number to indicate that the Company sold them (i.e., if the Company had purchased the contracts, the value would be reflected as a positive number).

In the presently described embodiment, the healthcare index rose above the expected threshold of 10%. The actual percentage increase can be determined by using the below formula:

((Index Value at Settlement/Index Value at Offering)/ Index Value at offering))*100%

In the presently described embodiment, the index rose 13.75%. Because the volatility of healthcare costs was higher than expected and the healthcare index is correlated to healthcare increases, the Company's yearly predictions were too low. It is assumed that the Company incurred medical expenses of $46 million. To properly hedge against its erroneous predictions, the Company applies the proceeds 509 from the sale of the contracts (e.g. $1,500,000) to the increased cost of healthcare. In the presently described embodiment, the Company has a net loss of $500,000, the difference between the increase in predicted healthcare costs and the monies earned on the futures contract. While the Company incurred a net loss of $500,000, without hedging in accordance with the present invention, the Company would have incurred a net loss of $2,000,000.

Table 3 illustrates the benefits to the Company of hedging risk utilizing a financial derivative based on the healthcare index in accordance with the present invention:

result is a total premium of $1 million. In the currently disclosed embodiment, the premiums reflect a total reimbursement of $1.5 million.

As the table illustrates, the Company's insurance costs were the least variable using a futures derivative in accordance with the present invention. If the Company chose not to hedge its risk, its total variability is +/−$2 million wherein if its elects to utilize stop loss insurance its exposure is limited to the premiums paid ($1 million) and its potential gain is limited to the maximum reimbursement ($1.5 million).

However, by utilizing futures contracts based on a healthcare index to hedge against risks associated with healthcare costs, the company's total variability is limited to +/−$500,000, which allows the Company to better predict its future earnings.

Figure 6:
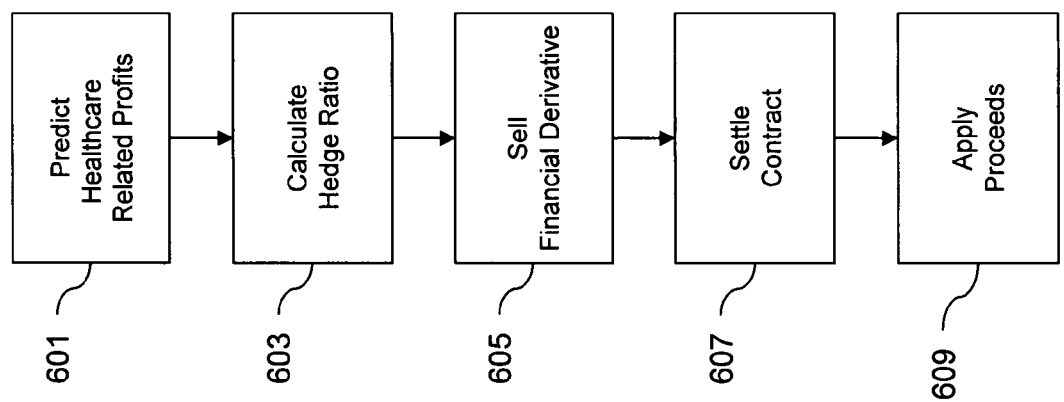
FIG. 6 is a flow chart depicting a method in which a health care provider can hedge against healthcare volatility by initially selling futures contracts with an underlying price determined by a healthcare index and later settling its futures contracts.

Referring now to FIG. 6, shown is an embodiment whereby a health care provider can hedge against healthcare cost volatility by using futures contracts based on a healthcare index in accordance with the present invention. The health care provider predicts its expected healthcare costs as depicted in step 601, including total revenue (premiums of $1 billion), incurred claim costs ($880 million), and administrative expenses ($80 million) for a predicted profit ($40 million). Thus, in the presently depicted embodiment, the healthcare provider's worst-case scenario is that the costs incurred will be $40 million higher than predicted. Similarly, the healthcare provider's best-case scenario is that its costs incurred will be $40 million less than predicted.

After predicting its costs, the healthcare provider must determine the number of futures contracts it needs to sell in order to effectively hedge by calculating its hedge ratio 603 using the price of contemporaneously available futures contracts based on the healthcare index. In this example, it is assumed that contemporaneous futures contracts are selling at $90.00, which reflects a 10% increase in the NIPA healthcare index over the course of the year. Using this data as a starting point, the healthcare provider decides how much risk exposure it wishes to hedge against and how much of its cash holdings it will spend to hedge that exposure. These factors

TABLE 3

Risk Management Comparison

| Company | Base Case No Hedge | | Stop-Loss | | Futures | |
|---|---|---|---|---|---|---|
| 1. Budget Projection | | | | | | |
| Claims Incurred 2004 (in $millions) | 40.0 | | 40.0 | | 40.0 | |
| Expected Trend 2004-2005 | 10% | | 10% | | 10% | |
| Expected Claims 2005 | 44.0 | | 44.0 | | 44.0 | |
| Net Expected (Excluding any reimbursement or cost from hedge) | 44.0 | | 44.0 | | 44.0 | |
| 2. Actual Experience | Low Trend | High Trend | Low Trend | High Trend | Low Trend | High Trend |
| Actual Trend 2004-2005 | 5% | 15% | 5% | 15% | 5% | 15% |
| Actual Claims 2005 (in $millions) | 42.0 | 46.0 | 42.0 | 46.0 | 42.0 | 46.0 |
| Cost of Hedge | N/A | N/A | 1.0 | 1.0 | N/A | N/A |
| Settlement of Hedge | N/A | N/A | 0.0 | (1.5) | 1.5 | (1.5) |
| Net Expenses | 42.0 | 46.0 | 43.0 | 45.5 | 43.5 | 44.5 |
| 3. Difference From Expected (in $millions) | (2.0) | 2.0 | (1.0) | 1.5 | (.5) | 0.5 |

In calculating the content of Table 3, it is assumed that standard stop loss provisions apply, $250,000 premium cost for individual coverage with a premium of $900,000 and 125% aggregate coverage with a premium of $100,000. The are combined to form a hedge ratio in any manner that is well known in the art. Indeed, today many entities either calculate their own hedge ratios with respect to non-healthcare risk or rely on consulting firms to help determine such ratios. Of course, other embodiments of the present invention allow for various other factors to be incorporated into a hedge ratio, as is well known in the art. The hedge ratio is then used in a well-known manner to calculate the number of contracts to sell.

After determining the number of contracts to sell, the healthcare provider would sell the requisite number of contracts 605. In this example of the embodiment of the present invention, we assume that the healthcare provider determines that it will sell 800 contracts at $90.00 per contract. It is also assumed that the value of the index on the date of sale is $4000. The healthcare provider can either construct custom futures contracts in the manner previously described or use a standardized futures contract, and we assume that the quantity of each contract is 10,000.

As in the previous example, the healthcare provider may offer the contracts for sale privately, over the counter, or publicly on an exchange. Of course, the healthcare provider can construct the contracts in any manner that it chooses, and may offer them for sale in any manner without departing from the spirit of the invention.

In this embodiment of the current invention, the margin is estimated to be $4,000,000. As previously described, the margin amount is determined by the particular exchange which is utilized for the transaction. For the purposes of this example, it is assumed that the contracts will trade on the Chicago Mercantile Exchange in a manner similar to the CPI Futures Contract which has a margin requirement of $1,250 per quarter. Because for the purposes of this example it is assumed the healthcare index related instrument is traded annually, an annual margin value of $5,000 per contract applies. Since 800 contracts are involved, the annual margin value for this transaction is calculated to be $4,000,000.

After offering the contacts for sale, the healthcare provider can allow the contracts to settle as shown in step 607. Alternatively, it can manage the futures contracts in any manner known, including repurchasing any portion of the contracts it has offered on any day at a value determined by the index price, or sell more contracts at the market price.

On the settlement date of the futures contracts, the healthcare provider delivers its contracts. The value of the healthcare index on the settlement date is used to determine the settlement price. In the currently described embodiment, it is assumed that on the settlement date the healthcare cost index increased to $4550. The contract value is then determined by the below formula:

$$100-(100*((\text{Index Value on settlement date}/\text{index value on offer date})-1))$$

Knowing that the value of the index at settlement is $4550 as the value of the index at offering was $4000, the contract value of $86.25.

To determine its total profit or loss, the healthcare provider uses the formula:

$$\text{\# Units/contract} * \text{\# of contracts} * \text{price difference} = \text{Profit (Loss)}$$

In the previously described embodiment the healthcare provider would profit in the amount $10,000,000. Note that when implementing the formula, the number of contracts is expressed as a negative number to indicate that the healthcare provider sold them (i.e., if the healthcare provider had purchased the contracts, the value would be reflected as a positive number).

In the presently described embodiment, the healthcare index rose above the expected threshold of 10%. The actual percentage increase can be determined by using the below formula:

$$((\text{Index Value at Settlement}/\text{Index Value at Offering})/\text{Index Value at offering}) * 100\%$$

In the presently described embodiment, the index rose 13.75%. Because the volatility was higher than expected and the healthcare index is correlated to healthcare increases, the healthcare provider's yearly cost predictions were too low. To properly hedge against its erroneous predictions, the healthcare provider applies the proceeds 609 from the sale of the contracts (e.g., $30 million) to the increased cost of healthcare. In the presently described embodiment, the healthcare provider has a net loss of $10,000,000, the difference between the increase in predicted healthcare costs and the monies earned on the futures contract. While the healthcare provider incurred a net loss of $10 million, without hedging in accordance with the present invention, the healthcare provider would have incurred a net loss of $40 million.

Table 4 illustrates the benefits to the healthcare provider of hedging risk utilizing a financial derivative based on the healthcare index in accordance with the present invention:

TABLE 4

Hedging Comparison

| Healthcare Provider | Base Case No Hedge | | Futures | |
|---|---|---|---|---|
| Budget Projection | | | | |
| 2005 Insured Premium (in $millions) | 1,000 | | 1,000 | |
| Claims Incurred 2004 | 800 | | 800 | |
| Expected Trend 2004-2005 | 10% | | 10% | |
| Expected Claims 2005 | 880 | | 880 | |
| Admin Expense 2005 | 80 | | 80 | |
| Expected Total Costs 2005 | 960 | | 960 | |
| Net Expected Profit (Excluding any reimbursement or cost from hedge) | 40 | | 40 | |
| Actual Experience | Low Trend | High Trend | Low Trend | High Trend |
| Actual Trend 2004-2005 | 5% | 15% | 5% | 15% |
| Actual Claims 2005 (in $millions) | 840 | 920 | 840 | 920 |
| Settlement of Hedge | — | — | 30 | (30) |
| Actual Net Costs | 920 | 1,000 | 950 | 970 |
| Actual Net Surplus | 80 | 0 | 50 | 30 |
| Difference From Expected (in $millions) | (40) | 40 | (10) | 10 |

As the table illustrates, the healthcare provider has the least variability using a futures derivative in accordance with the present invention. If the healthcare provider chose not to hedge its risk, the total variability is +/−$40 million. However, by utilizing a futures contract based on a healthcare index to hedge against risks associated with healthcare costs, the healthcare provider's total variability is limited to +/−$10,000,000. Using futures contracts represents the smallest variability, which allows the healthcare provider to better predict its future earnings.

Figure 8:
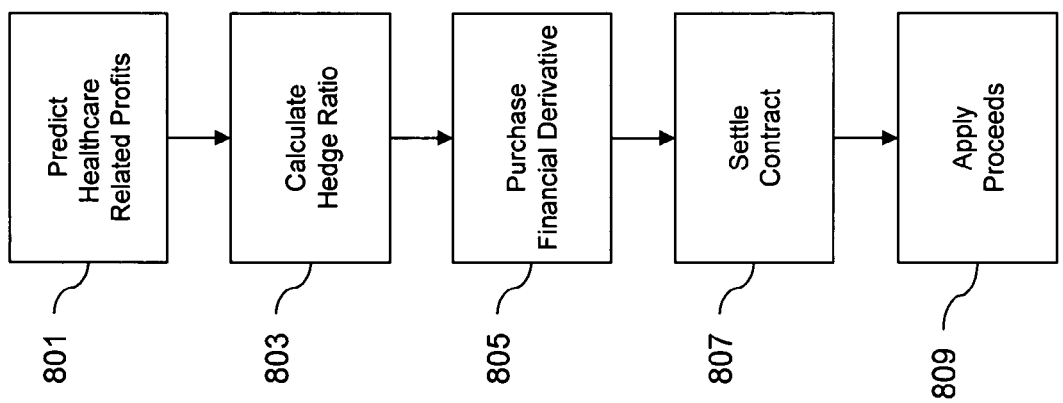
FIG. 8 is a flow chart depicting a method in which a hospital can hedge against healthcare volatility by initially purchasing futures contracts with an underlying price determined by a healthcare index and later settling its futures contracts.

Referring now to FIG. 8, shown is an embodiment of the present invention wherein a hospital can manage the risks associated with healthcare cost volatility by purchasing futures contracts based on a healthcare index. As in the previous examples, the hospital first predicts its expected healthcare revenue as depicted in step 801. For the purposes of this example, assumptions include total revenue ($160.6 million) and total expenses ($125.6 million) for a predicted profit ($35 million). In the example, the hospital's worst-case scenario is that the revenue generated will be $7.3 million lower than predicted. Similarly, the hospital's best-case scenario is that its revenues will be $7.3 million more than predicted.

After predicting its revenues, the hospital determines the number of futures contracts it needs to purchase in order to effectively hedge by calculating its hedge ratio 803 using the price of contemporaneously available futures contracts based on the healthcare index. As in the previous example, it is assumed that contemporaneous futures contracts are trading at $90.00, which reflects a 10% increase in the NIPA healthcare index over the course of the year. Again, using this data as a starting point, the hospital decides how much risk exposure it wishes to hedge against by forming a hedge ratio in any manner that is well known in the art to calculate the number of futures contracts to purchase.

After determining the appropriate number of contracts to purchase, the hospital would purchase the requisite number of contracts 805. In this example of the embodiment of the present invention, we assume that the hospital determines that it will purchase 140 contracts at $90.00 per contract. It is also assumed that the value of the index on the date of purchase is $4000 and that the quantity of each contract is 10,000.

As in the previous example, the hospital may purchase the futures contracts privately, over the counter, or publicly on an exchange.

In this embodiment of the present invention, the margin is estimated to be $700,000. After purchasing the contacts the hospital can allow the contracts to settle as shown in step 807 or it can manage the futures contracts in any manner known or previously described.

On the settlement date of the futures contracts, the hospital accepts its contracts. The value of the healthcare index on the settlement date is used to determine the settlement price. In the currently described embodiment, it is assumed that on the settlement date the healthcare cost index increased to $4250. The contract value is then determined by the below formula:

100−(100*((Index Value on settlement date/index value on offer date)−1))

Knowing that the value of the index at settlement is $4250 as the value of the index at offering was $4000, the contract value is $93.75.

To determine its total profit or loss, the hospital uses the formula:

Units/contract*# of contracts*price difference=Profit (Loss)

In this case the hospital would gain $3.75 million. In this example, the healthcare index did not rise above the expected threshold of 10%. The actual percentage increase can be determined by using the below formula:

((Index Value at Settlement/Index Value at Offering)/ Index Value at offering))*100% which yields 6.25%. Because the volatility was lower than expected and the healthcare index is correlated to hospital stays, the hospital's yearly revenue predictions were too high. To properly hedge against its erroneous predictions, the hospital applies the proceeds 809 from the purchase of the contracts (e.g., $3.75 million) to the decreased revenue. In the presently described embodiment, the hospital has a net loss of $3.25 million, the difference between the decrease in predicted revenue ($7,000,000 million) and the monies earned on the futures contract. While the hospital incurred a net loss of $3.25 million, without hedging in accordance with the present invention, the hospital would have incurred a net loss of $7 million.

Table 5 further illustrates the benefits to the hospital of hedging risk utilizing a financial derivative based on the healthcare index in accordance with the present invention:

TABLE 5

Hedging Comparison

| Hospital | Base Case No Hedge | | Futures | |
|---|---|---|---|---|
| Budget Projection | | | | |
| # of Hospital Beds | 600 | | 600 | |
| Average number of occupied beds in 2004 | 400 | | 400 | |
| Expected Trend 2004-2005 | 10% | | 10% | |
| Expected average number of occupied beds in 2005 | 440 | | 440 | |
| Expected Revenue 2005 | 160.6 | | 160.6 | |
| Expected Total Costs 2005 | 125.6 | | 125.6 | |
| Net Expected Surplus (Excluding any reimbursement or cost from hedge) | 35 | | 35 | |
| Actual Experience | Low Trend | High Trend | Low Trend | High Trend |
| Actual Trend 2004-2005 | 5% | 15% | 5% | 15% |
| Actual average number of occupied beds in 2005 (in $millions) | 420 | 460 | 420 | 460 |
| Settlement of Hedge | — | — | 3.75 | (3.75) |
| Actual Net Revenue | 153.3 | 167.9 | 157.05 | 164.15 |
| Actual Net Surplus | 30.6 | 39.4 | 34.35 | 35.65 |
| Difference From Expected (in $millions) | (4.4) | 4.4 | (0.65) | 0.65 |

As the table illustrates, the hospital has the least variability using a futures derivative in accordance with the present invention. If the hospital chose not to hedge its risk, the total variability is +/−$4.4 million. However, by utilizing a futures contract based on a healthcare index to hedge against risks associated with healthcare costs, the hospital's total variability is limited to +/−$650,000. Using futures contracts represents the smallest variability, which allows the hospital to better predict its future earnings.

As described generally above, the disclosed method of the present invention can utilize various sub-indices to create baskets. Generally, institutional investors create baskets containing stocks that do not accurately replicate an exchange-traded index (i.e., an "imperfect basket"). In contrast, a "perfect basket" accurately reflects the fluctuations of an exchange-traded index. While imperfect baskets have certain inherent benefits, they present problems when a risk manager attempts to utilize them to hedge a risk.

Where there is no tradable index that adequately mirrors the particular basket that an investor holds, the investor can devise a hedging vehicle by purchasing an over-the-counter "OTC" put option from an investment bank whose underlying asset matches the portfolio in question. In designing this OTC product the investor may also select a wide array of features using exotic options (i.e., average rate, knock-in, knock-out, compound and lookback options, etc.) that structure the risk/reward ratio in a variety of different forms.

Figure 9:
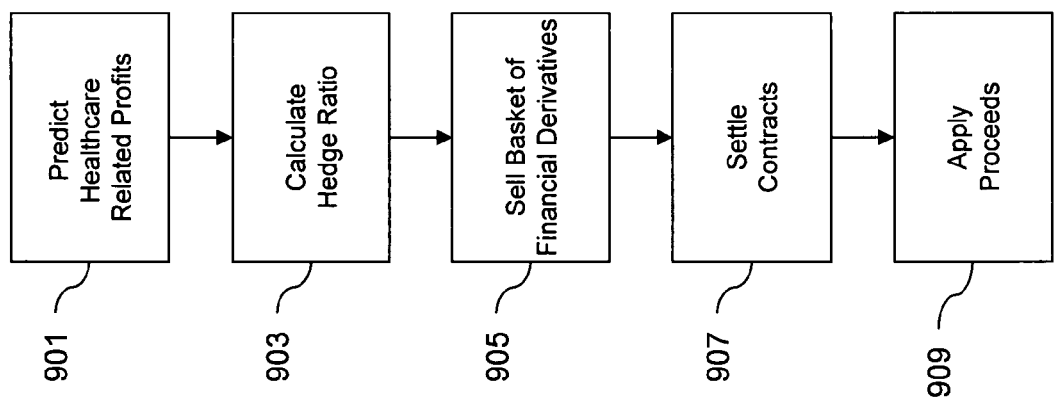
FIG. 9 is a flow chart depicting a method in which a Company can hedge against healthcare volatility by initially purchasing a basket of derivative contracts and later settling its derivative contracts.

Referring to FIG. 9, shown is an example of a self insured employer using a basket of financial derivatives based on both a healthcare index and a healthcare sub-index to manage its risk against healthcare cost volatility in accordance with the present invention. As in previous examples, an entity initially predicts its expected healthcare costs as depicted in step 901. In this example a Company's total medical expenses in the previous year were $40 million and costs are expected to rise 10% to 44 million the following year. In addition, the Company estimates that 50% of its total costs are related to prescription drug claims. Thus, the company predicts that it will incur $22 million in claims related to prescription drugs and $22 million for all other claims.

After predicting its costs, the Company must determine the appropriate number of futures contracts to sell in order to effectively hedge against the calculated risk associated with the prediction of step 901. In this example it is assumed that contemporaneous futures contracts for both the prescription drug index and the healthcare index are trading at $90.00, reflecting a 10% increase in the NIPA healthcare index and the prescription drug sub-index over the course of the year. Again, using this data as a starting point, the Company decides how much risk exposure it wishes to hedge against forming a hedge ratio in any manner that is well known in the art to calculate the number of contracts to sell.

After determining the number of contracts to sell, the Company would sell the requisite number of contracts 905. In this example of the embodiment of the present invention, we assume that the Company determines that it will sell 20 contracts at $90.00 per contract for each index for a total of 40 contracts. It is also assumed that the value of the healthcare index on the date of sale is $4000 and the prescription drug index is $800. The Company can either construct custom futures contracts in the manner previously described or use a standardized futures contract, and we assume the quantity of each standardized contract is 10,000 units per contract.

The Company may then offer either set of futures contracts for sale privately, over the counter, or publicly on an exchange. In the presently described embodiment, the contracts are offered on an exchange, but in alternative embodiments, the contracts could be standardized and offered on an exchange or the Company could construct the contracts in any manner that it chooses and offer them for sale in any manner.

After offering the contacts for sale, the Company can allow the contracts to settle as shown in step 907. Alternatively, it can manage the futures contracts in any manner known, including repurchasing any portion of the contracts it has offered on any day at a value determined by the index price, or sell more contracts at the market price.

On the settlement date of the futures contracts, the Company delivers its contracts. The value of the healthcare index on the settlement date is used to determine the settlement price. In the currently described embodiment, it is assumed that on the settlement date the healthcare cost index increased to $4400 and the prescription drug index increased to $910. The contract values are then determined by the below formula:

$$100-(100*((\text{Index Value on settlement date}/\text{index value on offer date})-1))$$

In the present case, the healthcare contract value is $90.00 and the prescription index contract is $86.25

To determine its total profit or loss, the Company uses the formula:

$$\text{\# Units/contract}*\text{\# of contracts}*\text{price difference}=\text{Profit (Loss)}$$

In the previously described embodiment the Company would profit in the amount $750,000 for the prescription drug contracts and would not profit from the sale of healthcare index contracts In the presently described embodiment, the healthcare index rose at the expected threshold of 10%. The actual percentage increase of the prescription drug index can be determined by using the below formula:

$$((\text{Index Value at Settlement}/\text{Index Value at Offering})/\text{Index Value at offering}))*100\%$$

In the presently described embodiment, the prescription drug index rose 13.75%. Because the volatility of the prescription drug index was higher than expected and the prescription drug index is correlated to drug cost increases, the Company's yearly predictions related to them were too low. Similarly, because the healthcare index was exactly what was predicted, the Company's healthcare related predictions were spot on.

It is assumed in this case that the Company incurred medical expenses of $46 million, of which the entire increase is attributable to the increase in prescription drug claims incurred (i.e., the incurred prescription drug claims were actually $24 million and the other incurred claims were $22 million). To properly hedge against its erroneous predictions, the Company applies the proceeds 909 from the sale of the contracts (e.g. $750,000) to the increased cost of healthcare. In the presently described embodiment, the Company has a net loss of $1,250,000, the difference between the increase in predicted costs and the monies earned on the futures contracts. While the Company incurred a net loss of $1,250,000, without utilizing a basket of derivatives, the Company would have incurred a net loss of $2,000,000.

Table 6 below illustrates the benefits to the Company of managing risk utilizing a basket of financial derivatives based on the indices in accordance with the present invention:

TABLE 6

Basket of Derivatives V. No Basket

| Company | No Basket of Derivatives | | Basket of Derivatives | |
| --- | --- | --- | --- | --- |
| | Prescription Index | Healthcare Index | Prescription Index | Healthcare Index |
| Number of Contracts Purchased | 0 | 40 | 20 | 20 |
| Price of Contract | 90 | 90 | 90 | 90 |
| Initial Value of Healthcare Index | 4000 | | 4000 | |
| Expected Value of Healthcare Index at Settlement | 4400 | | 4400 | |
| Actual Value of Healthcare Index at Settlement | 4400 | | 4400 | |

TABLE 6-continued

Basket of Derivatives V. No Basket

| | No Basket of Derivatives | | Basket of Derivatives | |
|---|---|---|---|---|
| Company | Prescription Index | Healthcare Index | Prescription Index | Healthcare Index |
| Actual Value of Healthcare Proceeds at Settlement | 0 | | 0 | |
| Initial Value of Prescription Drug Index | 800 | | 800 | |
| Expected Value of Prescription Drug Index at Settlement | 880 | | 880 | |
| Actual Value of Prescription Drug Index at Settlement | 910 | | 910 | |
| Actual Value of Prescription Drug Proceeds at Settlement | 0 | | $750,000 | |
| Total Increase in Expenses | $2,000,000 | | $2,000,000 | |
| Total Hedge Proceeds | 0 | | $750,000 | |
| Total Profit/Loss | ($2,000,000) | | ($1,250,000) | |

As the table illustrates, the company's insurance costs were the least variable using a basket of futures derivative in accordance with the present invention. If the company chose not to hedge its risk, its total variability is +/−$2 million. In addition, because all of the volatility was due to an increase in prescription drug claims, managing risk with a healthcare derivative is ineffective.

However, by utilizing futures contracts based on a basket of derivatives, the company's total variability is limited to −$1,250,000 which allows the company to better predict its future earnings.

What is claimed is:

1. A method of managing the risks of healthcare related costs comprising the steps of:
   predicting, via a processor, healthcare related expenses for at least one supplier of healthcare services for a predetermined future period of time;
   correlating, via said processor, a healthcare related data source with historical healthcare industry revenue data and healthcare industry cost data;
   creating, via said processor, a healthcare index for tracking a fluctuation of healthcare related costs based on said healthcare related data source;
   creating by said at least one supplier, via said processor, a hedge ratio, wherein said hedge ratio utilizes a price of an existing futures contract based on said healthcare index;
   utilizing, via said processor, said hedge ratio to determine a quantity of a derivative instrument to purchase;
   wherein said derivative instrument utilizes said healthcare index as a price source;
   purchasing by said at least one supplier, via said processor over an Exchange, said quantity of said derivative instrument; and
   selling by said at least one buyer of healthcare services, via said processor over said Exchange, said quantity of said derivative instrument.

2. A method according to claim 1 wherein said hedge ratio is calculated by determining a change of healthcare related costs from said healthcare index during said predetermined future period of time.

3. A method according to claim 1 wherein said utilizes data related to a change of healthcare related costs from said predicted healthcare expenses.

4. A method according to claim 1 wherein said derivative instrument further comprises a duration of time equal to said predetermined period of time.

5. A method according to claim 1 wherein said step of purchasing said derivative instrument occurs at the beginning of said predetermined period of time.

6. A method according to claim 1 wherein said derivative instrument further comprises a settlement date.

7. A method according to claim 6 wherein said settlement date occurs at the end of said predetermined future period of time.

8. A method according to claim 6 wherein said step of selling a quantity of said derivative instrument occurs after said settlement date of said derivative instrument.

9. A method according to claim 1 further comprising the step of purchasing by said at least one supplier, via said Exchange, a second quantity of said derivative instrument.

10. A method according to claim 9 wherein said second quantity of said derivative instrument further comprises a price determined by said healthcare index.

11. A method according to claim 1 wherein said step of selling a quantity of said derivative instrument occurs during said predetermined future period of time.

12. The method of claim 1 wherein said healthcare index comprises data related to one of a healthcare cost index, prescription drug cost index, or health insurance cost index.

13. The method of claim 1 wherein said derivative instrument comprises at least one of a futures contract, an option, or a futures option.

14. A method of managing the risks of healthcare related costs by at least one supplier of healthcare services comprising the steps of:
   predicting by said at least one supplier, via a processor, healthcare related expenses for a predetermined future period of time;
   correlating, via said processor, a healthcare related data source with historical healthcare industry revenue data and healthcare industry cost data;
   creating, via said processor, a healthcare index for tracking fluctuation of healthcare costs based on said healthcare related data source;
   creating by said at least one supplier, via said processor, a hedge ratio, wherein said hedge ratio utilizes a price of an existing futures contract based on a healthcare index;

utilizing, via said processor, said hedge ratio to determine a quantity of a derivative instrument to sell;

wherein said derivative instrument comprises a price determined by said healthcare index;

purchasing by at least one buyer of healthcare services, via said processor over an Exchange, said determined quantity of said derivative instrument; and selling by said at least one buyer said quantity of said derivative instrument.

15. A method according to claim 14 further comprises the step of calculating said hedge ratio by determining a change of healthcare related costs from said healthcare index during said predetermined future period of time.

16. A method according to claim 14 wherein said hedge ratio utilizes data related to a change of healthcare related costs from said predicted healthcare expenses.

17. A method according to claim 14 wherein said derivative instrument further comprises a duration of time equal to said predetermined period of time.

18. A method according to claim 14 wherein said step of purchasing said derivative instrument occurs at the beginning of said predetermined period of time.

19. A method according to claim 14 wherein said derivative instrument further comprises a settlement date.

20. A method according to claim 19 wherein said settlement date occurs at the end of said predetermined future period of time.

21. A method according to claim 14 further comprising the step of offering to sell, by said at least one supplier, a second quantity of a derivative instrument.

22. A method according to claim 21 wherein said second quantity of said derivative instrument comprises a price determined by said healthcare index.

23. A method according to claim 14 wherein said step of selling a quantity of said derivative instrument occurs during said predetermined future period of time.

24. The method of claim 14 wherein said healthcare index comprises data related to one of a healthcare cost index, prescription drug cost index, or health insurance cost index.

25. The method according to claim 14, wherein said derivative instrument comprises one of a futures contract, an option, or a futures option.

26. A method according to claim 1, wherein said at least one supplier of healthcare services comprises one of a pharmaceutical company, a hospital system, a medical equipment supplier or a healthcare mutual fund.

27. The method according to claim 12, wherein said healthcare cost index comprises data related to one of hospitals, physicians, dentists, home health care, medical laboratories, eye examinations, nursing homes, non-prescription drugs or medical supplies.

28. The method according to claim 12, wherein said prescription drug cost index comprises data related to prescription drugs.

29. The method according to claim 12, wherein said health insurance cost index comprises data related to medical care insurance, income loss insurance, or workers compensation insurance.

30. The method according to claim 14, wherein said at least one supplier of healthcare services comprises one of a pharmaceutical company, a hospital system, a medical equipment supplier or a healthcare mutual fund.

31. The method according to claim 14, further comprising the step of correlating, via statistical software embedded in hardware, healthcare index data with historical healthcare related revenue data for said at least one supplier.

32. A method according to claim 27, wherein said at least one buyer of healthcare services comprises one of a health plan, a self-insured employer, or a re-insurer.

* * * * *